(12) United States Patent
Ashburn, Jr. et al.

(10) Patent No.: US 7,797,118 B2
(45) Date of Patent: Sep. 14, 2010

(54) REAL-TIME CLOCK CALIBRATION METHOD AND SYSTEM

(75) Inventors: Michael A. Ashburn, Jr., Groton, MA (US); Stephen W. Harston, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 539 days.

(21) Appl. No.: 11/901,825

(22) Filed: Sep. 19, 2007

(65) Prior Publication Data
US 2008/0082279 A1 Apr. 3, 2008

Related U.S. Application Data

(60) Provisional application No. 60/848,917, filed on Oct. 3, 2006.

(51) Int. Cl.
*G01D 18/00* (2006.01)
(52) U.S. Cl. .............................. 702/89; 375/354; 331/46
(58) Field of Classification Search ................... 702/79, 702/85, 89, 179
See application file for complete search history.

(56) References Cited

U.S. PATENT DOCUMENTS

| | | | |
|---|---|---|---|
| 5,654,718 A | 8/1997 | Beason et al. | |
| 5,864,315 A | 1/1999 | Wells, II et al. | |
| 6,630,872 B1 | 10/2003 | Lanoue et al. | |
| 6,809,556 B1 * | 10/2004 | Bronfer et al. | 327/99 |
| 7,446,587 B2 * | 11/2008 | Kato | 327/293 |

* cited by examiner

*Primary Examiner*—Eliseo Ramos Feliciano
*Assistant Examiner*—Ronald L Biegel
(74) *Attorney, Agent, or Firm*—Kenyon & Kenyon LLP

(57) ABSTRACT

Real-time clock calibration is accomplished by generating a fast clock signal and a slow clock signal from an uncompensated clock signal; selectively, momentarily, replacing the uncompensated clock signal with the fast and slow clock signal to generate a compensated clock signal; generating from the compensated clock signal a calibration strobe and window trigger; responding to the window trigger to detect any uncompensated clock signal frequency error and responding to the calibration strobe to selectively, momentarily, replace the uncompensated clock signal with the fast or slow clock signal to reduce the clock signal frequency error.

33 Claims, 5 Drawing Sheets

REAL-TIME CLOCK CALIBRATION METHOD AND SYSTEM

RELATED APPLICATIONS

This application claims benefit of and priority to U.S. Provisional Application Ser. No. 60/848,917 filed Oct. 3, 2006 incorporated herein by this reference.

FIELD OF THE INVENTION

This invention relates to a real-time clock calibration method and system.

BACKGROUND OF THE INVENTION

A Real-Time Clock (RTC) is typically driven by a clock signal generated from a crystal oscillator or the like, with some error in frequency. In addition to an initial frequency error under the typical operating conditions of the clock generator, the frequency error will shift at different operating conditions including supply voltage and/or temperature. Typical frequency shifts can be on the order of 100 ppm-200 ppm or possibly much larger depending on the clock generator. Such frequency error, both initially and over different operating conditions, is not acceptable in many applications.

In certain applications, an RTC must be run from a battery either some, or all of the time. In many of these applications, current levels must be on the order of single micro-amps down to hundreds of nano-amps. At these consumption levels, switching currents in digital circuitry, even at clock speeds as slow as 32 kHz, can be critical to the total operating current of the part. As a result, great care is required in the implementation of the RTC circuitry as it is very desirable in order to minimize its supply current.

Previous approaches to the problem have certain shortcomings: additional (faster and slower) clocks, and other circuitry are introduced to provide adjustment of the uncompensated clock. This adds to the power and area requirements. Additionally large adjustments may be done in widely spaced, short bursts that can cause jitter in the resulting compensated clock. Often the digital circuitry is synchronized with the higher speed uncompensated clock which increases required current.

BRIEF SUMMARY OF THE INVENTION

It is therefore an object of this invention to provide an improved calibrated real-time clock system and method.

It is a further object of this invention to provide such an improved calibrated real-time clock system and method which provides a distributed, more even adjustment for clock error.

It is a further object of this invention to provide such an improved calibrated real-time clock system and method which saves power and die area by using an edge detector and dividers to generate adjustment clocks rather than using separate additional clocks.

It is a further object of this invention to provide such an improved calibrated real-time clock system and method which operates portions of the circuit with lower supply current by using ripple dividers and lower frequency clocks.

The invention results from the realization that an improved calibration of a real-time clock system which offers a distributed, more even adjustment, requires less area and consumes less current can be achieved by generating a faster and a slower clock signal from an uncompensated clock signal and selectively, momentarily replacing the uncompensated clock signal with the faster or slower clock signal to generate a compensated clock signal from which a calibration strobe and window trigger are derived. Then in response to the window trigger to detect any uncompensated clock signal frequency error and in response to the calibration strobe to selectively, momentarily replace the uncompensated clock signal with the faster or slower clock signals to reduce the uncompensated clock signal frequency error.

The subject invention, however, in other embodiments, need not achieve all these objectives and the claims hereof should not be limited to structures or methods capable of achieving these objectives.

This invention features a calibrated real-time clock system including a first clock responsive to an uncompensated clock signal for generating a fast clock signal at higher frequency then the uncompensated clock signal and a second clock responsive to the uncompensated clock signal for generating a slow clock signal at lower frequency than the uncompensated clock signal. A switching circuit selectively, momentarily, replaces the uncompensated clock signal with the fast or slow clock signal to generate a compensated clock signal. A calibrated timing circuit generates a calibration strobe and a window trigger from the compensated clock signal. A logic circuit is responsive to the window trigger for detecting any uncompensated clock frequency error and is responsive to the calibration strobe for driving the switching circuit to selectively, momentarily, replace the uncompensated clock signal with the fast or slow clock signals to reduce the uncompensated clock frequency error.

In a preferred embodiment the fast clock signal may be twice the frequency of the uncompensated clock signal. The slow clock signal may be one half the frequency of the uncompensated clock signal. The first clock may include an edge detector circuit. The second clock may include a divide by two counter. The calibration timing circuit may include a calibration strobe counter. The calibration timing circuit may include a window trigger counter. The window trigger counter may be driven by the calibration strobe counter. The calibration strobe counter may divide the compensated clock signal by a first divisor. The window trigger counter may divide the calibration strobe by a second divisor. The uncompensated clock signal may be approximately 32,768 Hz. The first divisor may be 4032. The second divisive may be 248. The switching circuit may replace the uncompensated clock signal with a predetermined number of pulses per calibration strobe. The predetermined number may be one. There may be a control circuit responsive to a calibration strobe for enabling one of the first and second clocks as needed in response to a calibration value. The control circuit may enable the first and second clocks periodically following a calibration strobe. The first and second clocks may be always enabled. At least one of the strobe counter and window trigger counter may include a ripple counter. The strobe counter may include a first ripple counter and a second counter. The first ripple counter may provide a sub-clock for operating portions of the control circuit, the second counter, the window trigger counter and the logic circuit.

The invention also features a real-time clock calibration method including generating a fast clock signal and a slow clock signal from an uncompensated clock signal where the fast clock signal is faster and the slow clock signal is slower than the uncompensated clock signal. The uncompensated clock signal is selectively momentarily replaced with the fast and slow clock signal to generate a compensated clock signal. From the compensated clock signal there is generated a calibration strobe and a window trigger. In response to the window trigger there is detected any uncompensated clock signal frequency error. In response to a calibration strobe the uncompensated clock signal is selectively, momentarily, replaced with the fast or slow clock signal to reduce the clock signal frequency error.

In a preferred embodiment the fast clock signal may be twice the frequency of the uncompensated clock signal. The slow clock signal may be half the frequency of the uncompensated clock signal. The calibration strobe may be derived from the uncompensated clock signal divided by a first divisor. The window trigger may be derived from the calibration strobe divided by a second divisor. The uncompensated clock signal may be approximately 32,768 Hz. The first divisor may be 4032. The second divisor may be 248. The uncompensated clock signal may be replaced with a predetermined number of pulses per calibration strobe. The number may be one. The calibration strobe may enable one of the first and second clock signals as needed in response to a calibration value. The calibration strobe may enable one of the first and second clock signals periodically. The first and second clock signals may be always enabled.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
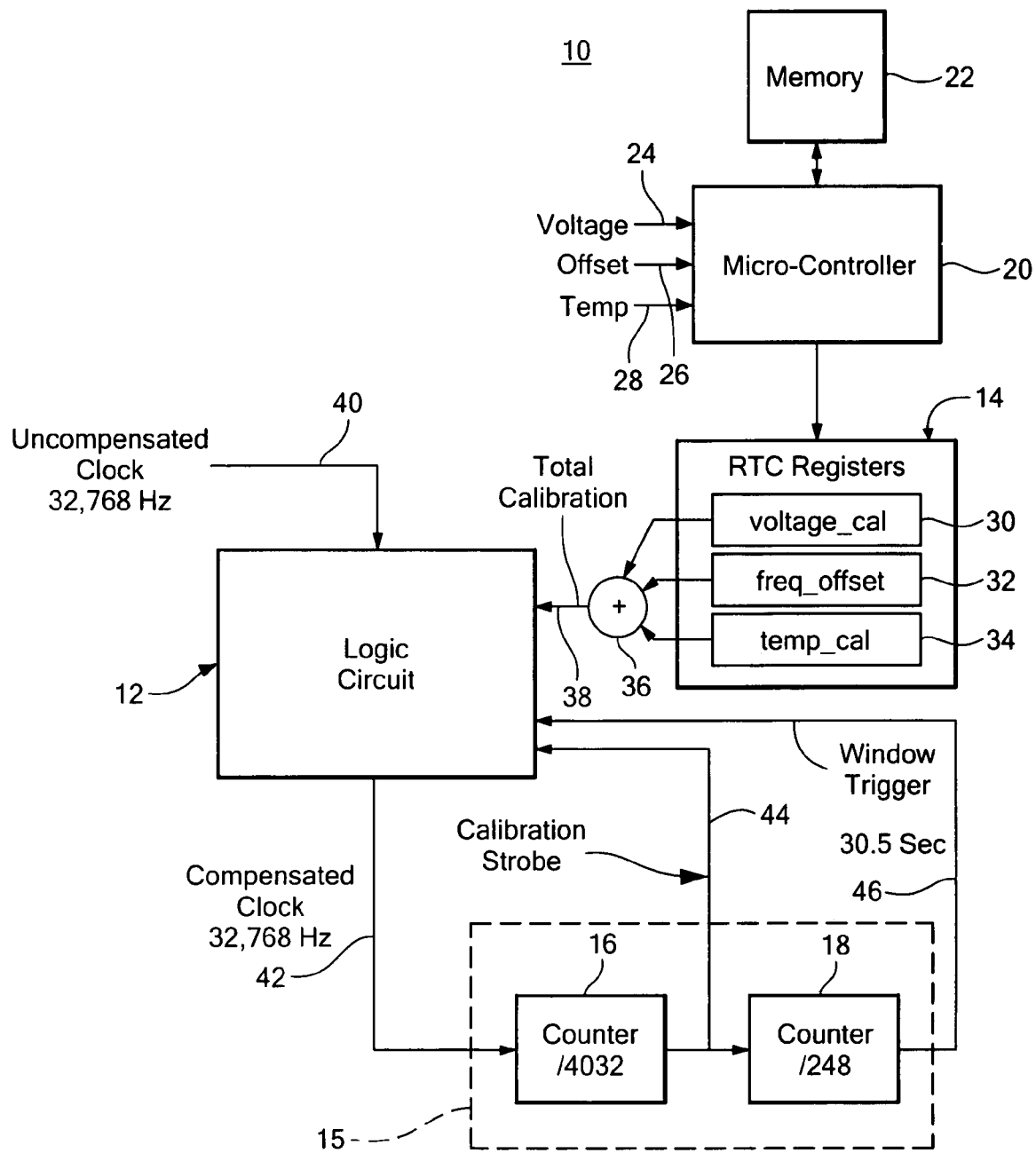
FIG. 1 is schematic block diagram of a calibrated real-time clock system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The frequency compensation described here replaces the input clock to the real time clock (RTC) with a faster or slower clock over a short interval of time at periodic update points (throughout a compensation cycle). This is done in order to increase or decrease the effective clock rate into the RTC, such that the frequency error of the clock is removed. Furthermore, the periodic points at which the clock may be corrected are spread evenly throughout the full compensation cycle resulting in minimal jitter in the compensated clock.

There are features of the invention that result in minimal supply current. One is the generation of the auxiliary (faster and slower) clocks from the uncompensated clock such as by edge detection (faster) and ÷2 (slower) thereby eliminating the need for separate clocks with their attendant space and power requirements. Another is the enablement of those faster and slower signals only when specifically called for adjustment or periodically during a triggered adjustment window.

There is shown in FIG. 1 a calibrated real-time clock system 10 according to this invention including logic circuit 12, real time registers 14, and a calibration counter 15 including first and second counters 16 and 18. Also shown are microcontroller 20 and memory 22. Microcontroller 20 monitors a number of parameters such as voltage 24, frequency offset 26, and temperature 28 which cause errors in the clock signal. It then extracts from memory 22 the clock frequency error associated with those parameters and deposits those error values in the appropriate RTC registers: voltage register 30, frequency offset register 32, and temperature register 34. These errors are combined in summer 36 to provide a composite error signal on line 38 to logic circuit 12. Logic circuit 12 receives an uncompensated clock signal on line 40 such as a 32,768 Hz signal with some frequency error and produces a compensated clock signal with an average clock frequency very near to 32,768 Hz at its output 42. The compensated clock output on line 42 is divided down, for example, in counter 16, by an amount, for example, of 4,032. Thus, counter 16, also known as the calibration strobe counter, provides an output on line 44, approximately eight times per second to logic circuit 12. The output of calibration strobe counter 16 which acts as the calibration strobe is also delivered to a second counter 18, the window trigger counter, which may divide the signal down again by a factor of 248. This produces the window trigger on line 46 approximately once every 30.5 seconds.

In operation the occurrence of the window trigger on line 46 causes logic circuit 12 to read any clock frequency error on line 38 and at the next calibration strobe on line 44 to adjust the clock signal to reduce that error. The adjustment may be made all at one time following the occurrence of one strobe signal or it may be distributed over a number of strobe signals. Logic circuit 12 momentarily stops the uncompensated clock signal on line 40 and momentarily replaces it with either a faster or a slower clock signal to provide the compensated clock signal on line 42. This may be done one, two or n pulse at each strobe signal or the adjustment may be done all at once at one calibration strobe. For example, if the error signal on line 38 indicates that the clock signal should be increased by 12 parts per million then upon the occurrence of a window trigger on line 46, logic circuit 12 has the choice of adding one pulse each upon the occurrence of each calibration strobe on line 44 until 12 pulses have been added or it can add e.g. two each on six probes or all twelve each on one probe . . . . For convenience counter 16 is a divide by 4032 counter and counter 12 is a divide by 248 counter. In can be seen then that combining the divisors 4032 and 248 there is a total division of 999,936 or effectively one million. That is, the window triggers occurring every 30.5 seconds actually define approximately one million clock pulses, which makes the adjustment using the part per million (ppm) error on line 38 direct and simple to deal with.

Figure 2:
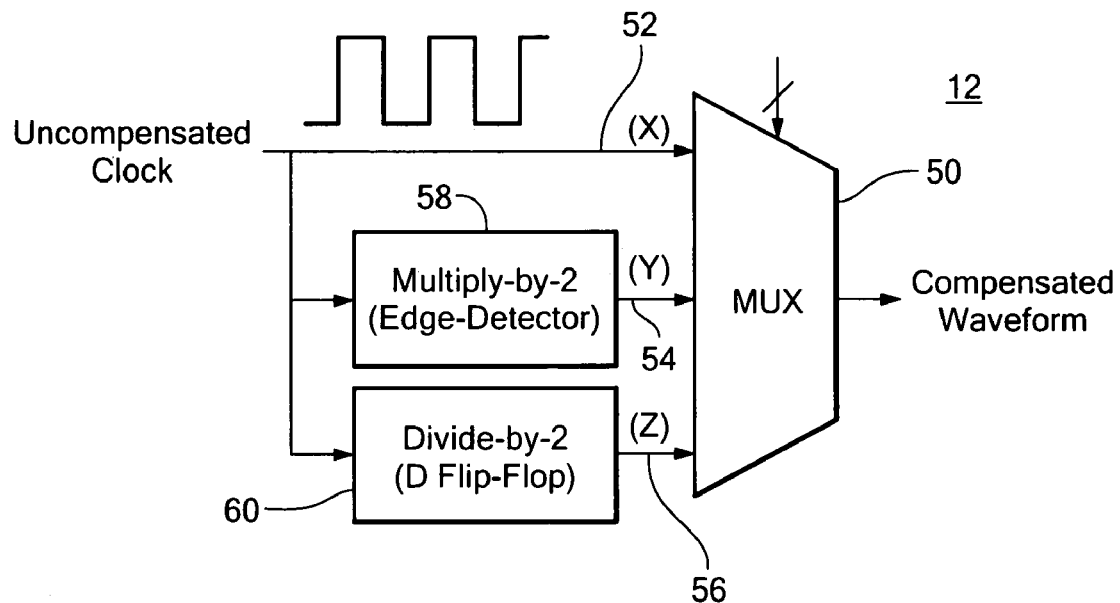
FIG. 2 is a more detailed schematic diagram of the logic circuit of FIG. 1.

Logic circuit 12, FIG. 2, among other things includes a switching circuit such as mux 50, having three inputs, uncompensated clock input 52X, a fast clock input 55, Y and a slow clock input 56, Z. Fast clock input 54 is derived from multiply by two circuit 58 which may be simply an edge detector that detects both the positive going and negative going transitions of uncompensated clock signal on line 52. Slow clock 60 may be simply a divide by two circuit implemented by a "D" flip flop, for example, which divides the uncompensated clock signal on 52 by two.

Figure 3:
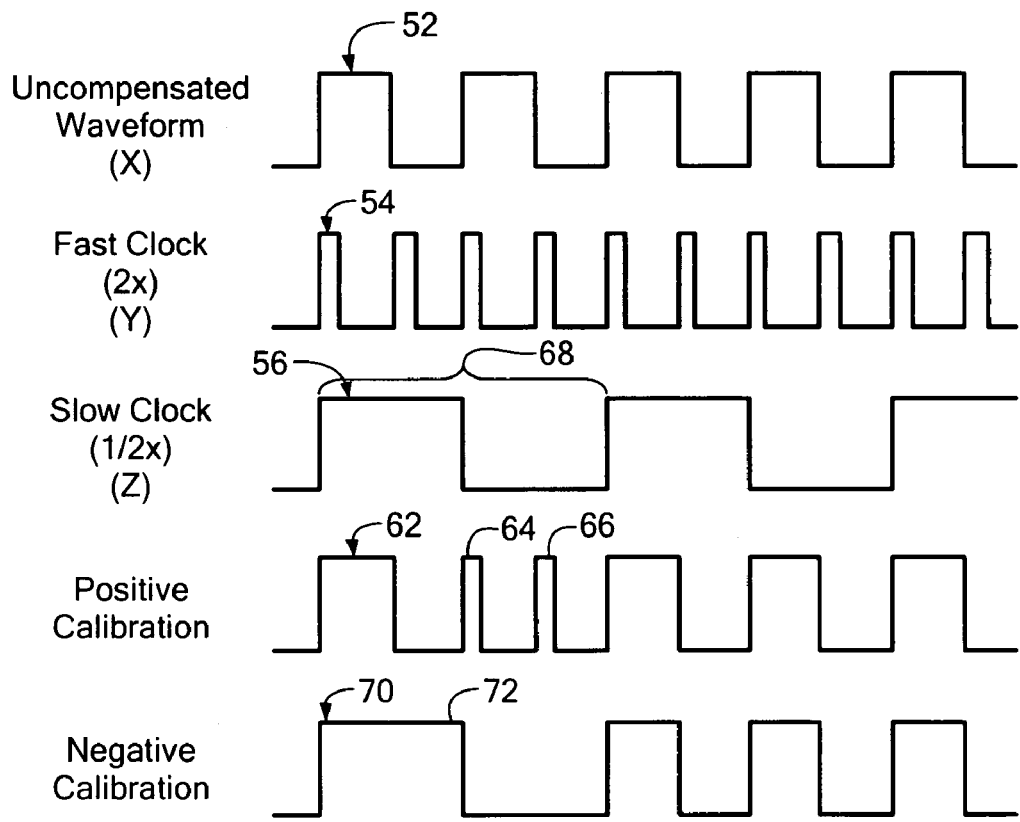
FIG. 3 illustrates certain waveforms occurring in the logic circuit of FIG. 2.

Referring now to FIGS. 2 and 3 together the uncompensated waveform X is shown at 52, the fast clock Y at 54, and the slow clock Z at 56. If the error in parts per million on line 38, FIG. 1, requires an increase in the frequency, uncompensated clock 52 is stopped by mux 50 and fast clock 54 is run in its place momentarily for one cycle. This produces the positively calibrated or compensated clock 62 which has two pulses 64 and 66 where it would normally have but one. This would occur each time after a window trigger has occurred each time a calibration strobe occurs. Note that while only one pulse is shown to be added in the compensated signal 62, this is to simplify the explanation as any number of pulses could be added at that point. Of course it increases the distribution and evenness to add the pulses over as many calibration strobes as possible. If the error signal on line 38 indicates that the uncompensated signal frequency should be reduced, then one cycle 68 of slow clock 56 momentarily switch 50 causes one cycle 68 of slow clock 56 to replace the uncompensated wave form 52 so that the compensated waveform then appears as at 70 as but one wide pulse 72 and one space where there were originally in the uncompensated wave form two positive pulses and two spaces. Again for ease of understanding only one cycle of the slow clock 56 has been momentarily inserted during the calibration strobe but any number could be inserted during the calibration strobe compensation can be done all upon one calibration strobe or distributed over many calibration strobes.

Figure 4:
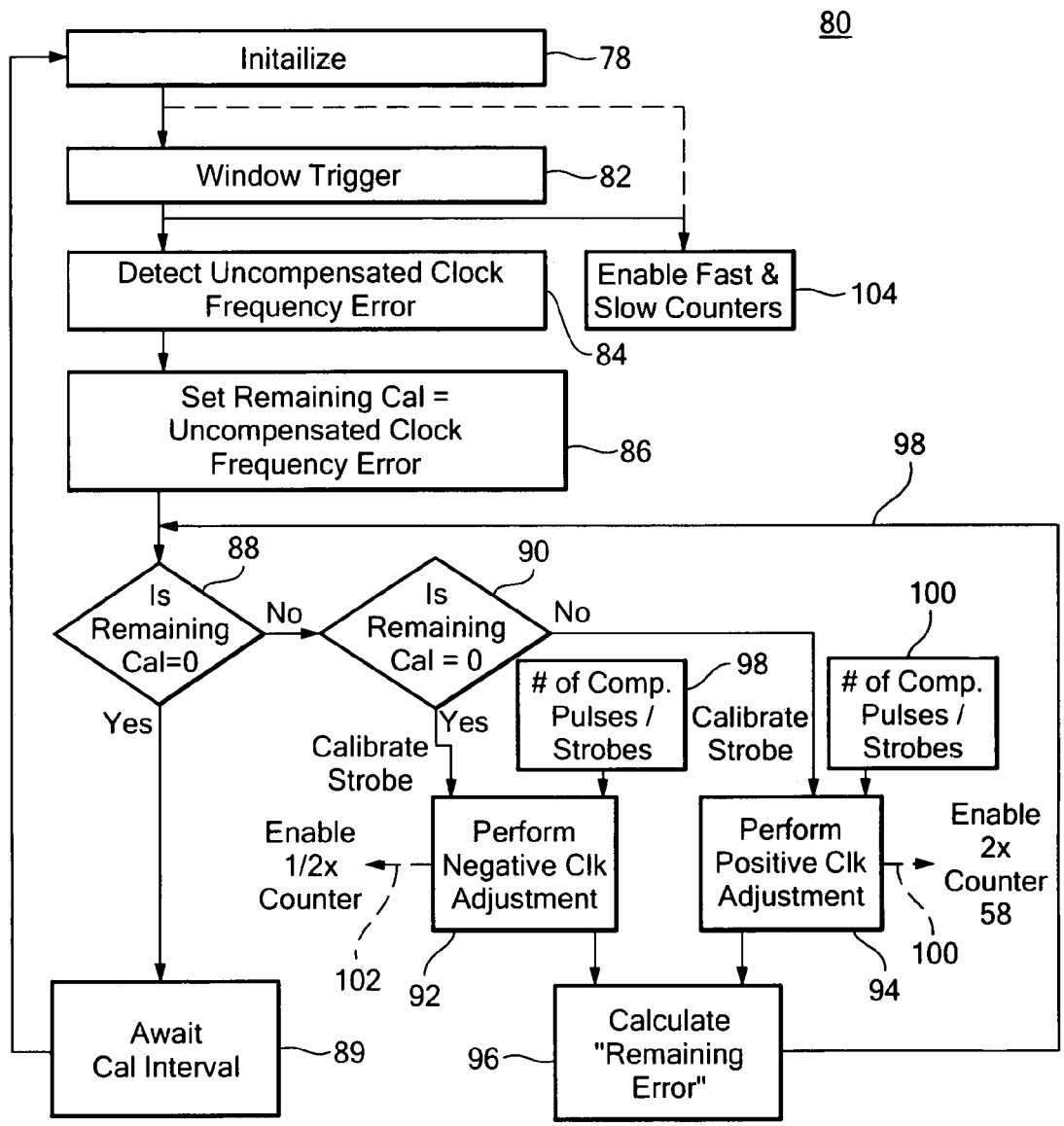
FIG. 4 is a flow chart of the real-time clock calibration method of this invention.

After an initialization 78, the method 80, FIG. 4, of this invention provides a window trigger 82. Upon the occurrence of window trigger 82 any frequency error in the uncompensated clock is detected 84. The remaining calibration error is then set to the uncompensated clock frequency error. Then, an inquiry is made as to whether the remaining error is equal to zero. Assuming that there was a clock frequency error detected the answer then would be no. If the remaining error is zero 88 the system simply goes back and waits for the next calibration interval 89 then reinitializes 78 and waits for the next window trigger 82. If the remaining clock frequency error is not zero inquiry is then made as to whether the clock frequency error is greater than zero, 90. If it is, then at the next calibration strobe occurrence negative clock adjustment is performed 92 by momentarily replacing the uncompensated clock signal with the slow clock signal. If the error is not greater than zero, meaning its less than zero, then the uncompensated clock is momentarily replaced by the fast clock 94. In either case after the adjustment the remaining error is calculated 96. If there still is error remaining the system cycles back over line 98 to step 88. The number of compensating pulses provided per calibration strobe may be fixed or controlled as indicated at 98 and 100. To save power the fast and slow counters may be turned on only when they are needed to actually add or subtract one or more pulses as indicated by the enable 2× circuit 58 line 100 and the enable ½× circuit 60 line 102. Alternatively, the fast and slow counters may be selectively or together enabled as indicated at 104 upon the occurrence of a window trigger 82. Alternatively at the cost of additional power they may be enabled all the time.

Figure 5:
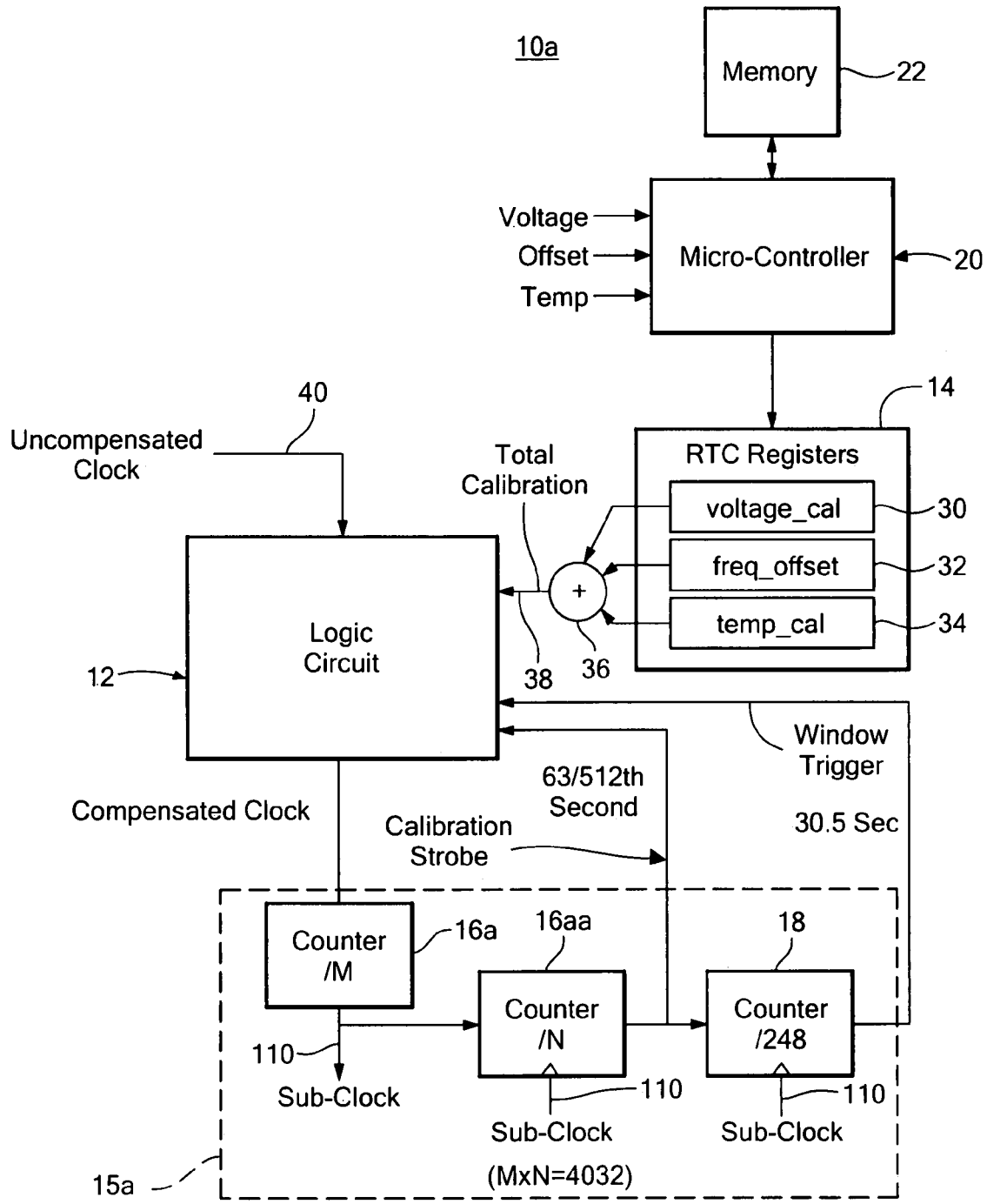
FIG. 5 is a schematic block diagram of another embodiment of a calibrated real-time clock system according to this invention.

While in FIG. 1, calibration counter 15 is shown as including two counters 16 and 18, this is not a necessary limitation of the invention. As shown in FIG. 5 calibration counter 15*a* may include two counters 16*a* and 16*aa* implementing counter 16 in FIG. 1. In FIG. 5 counter 16*a* may be a divide by M counter and counter 16*aa* may be divide by N counter where if it is desired to keep the same timing as previously M times N would be equal to 4032. As an added advantage counter 16*a* may be a ripple counter of 8 or 16 bits and its output in addition to feeding counter 16*aa* may function as a sub clock as indicated on line 110. This sub-clock can be used to clock portions of logic circuit 12 as well as the other counters 16*aa* and 18 in order to further reduce the current requirements of the system.

Figure 6:
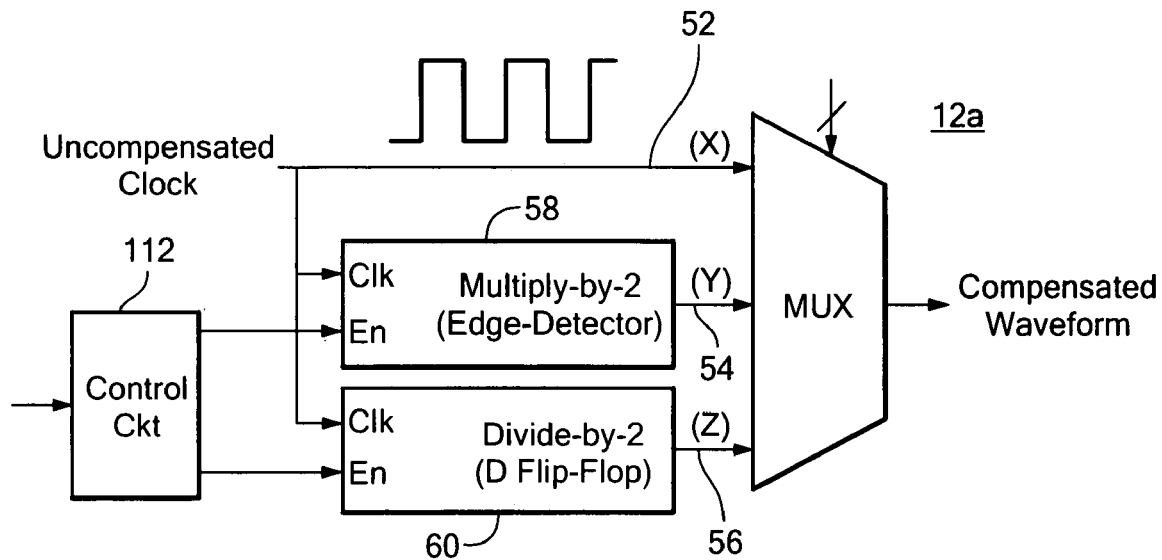
FIG. 6 is a more detailed schematic diagram of the logic circuit of FIG. 5.
Figure 7:
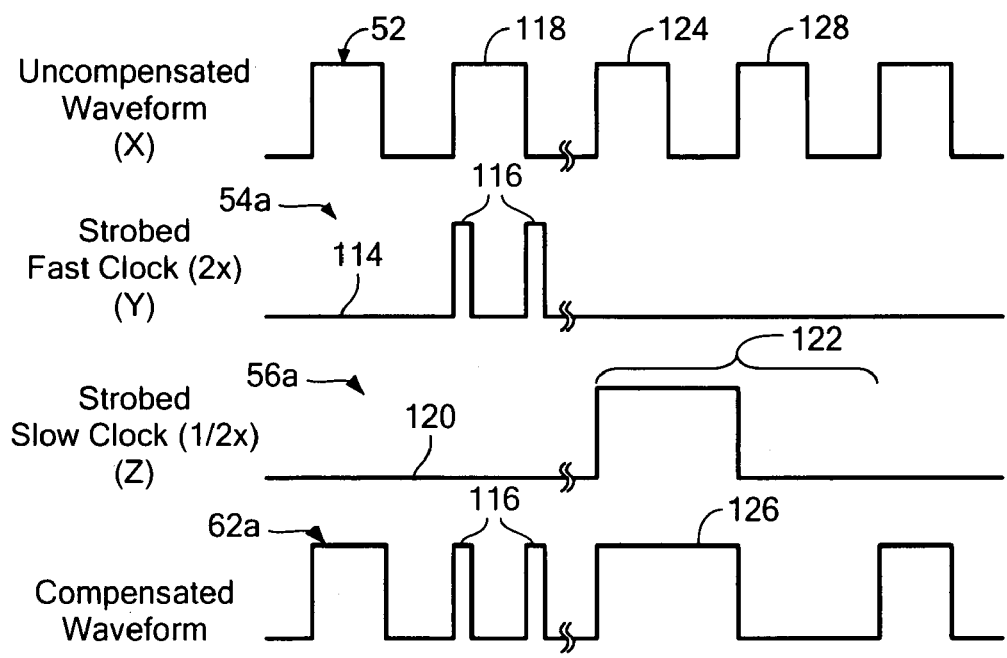
FIG. 7 illustrates certain waveforms occurring in the logic circuit of FIG. 6.

Logic circuit 12*a*, FIG. 6, may also include a control circuit 112, which, as explained with respect to features 100 and 102 in FIG. 4, can be made to enable counters 58 and 60 together on the occurrence of each window trigger or independently upon the occurrence of a strobe that specifically requires that counter to be operative. Thus the fast clock would be zero 114, FIG. 7, and would provide two pulses 116 when enabled to produce a compensated waveform such as shown as 62*a* where the two pulses 116 take the place of the single pulse 118 in the uncompensated waveform 52. There is depicted at some later time a similar operation for the divide by two counter 60 whereby the slow clock 56*a* is at zero 120 until enabled to provide one cycle 122 which provides one pulse and which effectively replaces pulse 124 with a pulse 126 but does not replace pulse 128 and so the compensated clock will have one less pulse.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A calibrated real-time clock system comprising:
   a first clock responsive to an uncompensated clock signal for generating a fast clock signal at higher frequency than said uncompensated clock signal;
   a second clock responsive to said uncompensated clock signal for generating a slow clock signal at lower frequency than said uncompensated clock signal;
   a switching circuit for selectively, momentarily, replacing said uncompensated clock signal with said fast or slow clock signal to generate a compensated clock signal;
   a calibration timing circuit for generating a calibration strobe and a window trigger from said compensated clock signal; and
   a logic circuit responsive to said window trigger for detecting any uncompensated clock frequency error and responsive to said calibration strobe for driving said switching circuit to selectively, momentarily, replace said uncompensated clock signal with said fast or slow clock signal to reduce the uncompensated clock frequency error.

2. The calibrated real-time clock system of claim 1 in which said fast clock signal is twice the frequency of said uncompensated clock signal.

3. The calibrated real-time clock system of claim 2 in which said first clock includes an edge detector.

4. The calibrated real-time clock system of claim 1 in which said slow clock signal is one-half the frequency of said uncompensated clock signal.

5. The calibrated real-time clock system of claim 4 in which said second clock includes a divide by two counter.

6. The calibrated real-time clock system of claim 1 in which said calibration timing circuit includes a calibration strobe counter.

7. The calibrated real-time clock system of claim 6 in which said calibration timing circuit includes a window trigger counter.

8. The calibrated real-time clock system of claim 7 in which said window trigger circuit is driven by said calibration strobe counter.

9. The calibrated real-time clock system of claim 7 in which said calibration strobe counter divides said compensated clock signal by a first divisor.

10. The calibrated real-time clock system of claim 9 in which said window trigger counter divides said calibration strobe by a second divisor.

11. The calibrated real-time clock system of claim 10 in which said uncompensated clock signal is approximately 32,768 Hz.

12. The calibrated real-time clock system of claim 10 in which said second divisor is 248.

13. The calibrated real-time clock system of claim 9 in which said first divisor is 4032.

14. The calibrated real-time clock system of claim 7 in which at least one of said strobe counter and window trigger counters includes a ripple counter.

15. The calibrated real-time clock system of claim 6 in which strobe counter includes a first ripple counter and a second counter and said first ripple counter provides a subclock for operating said second counter, said window trigger counter and said logic circuit.

16. The calibrated real-time clock system of claim 1 in which said switching circuit replaces said uncompensated clock signal with a predetermined number of pulses per calibration strobe.

17. The calibrated real-time clock system of claim 16 in which said predetermined number is one.

18. The calibrated real-time clock system of claim 1 further including a control circuit responsive to a calibration strobe for enabling one of said first and second clocks as needed in response to a calibration value.

19. The calibrated real-time clock system of claim 1 further including a control circuit for enabling said first and second clocks periodically following a calibration strobe.

20. The calibrated real-time clock system of claim 1 in which said first and second clocks are always enabled.

21. A real-time clock calibration method comprising:
generating a fast clock signal and a slow clock signal from an uncompensated clock signal where the fast clock signal is faster and the slow clock signal is slower than said uncompensated clock signal,
selectively, momentarily, replacing the uncompensated clock signal with the fast or slow clock signal to generate a compensated clock signal;
generating from the compensated clock signal a calibration strobe and window trigger;
detecting in response to said window trigger any uncompensated clock signal frequency error; and
selectively, momentarily, replacing in response to said calibration strobe the uncompensated clock signal with the fast or slow clock signal to reduce the clock signal frequency error.

22. The real-time clock calibration method of claim 21 in which said fast clock signal is twice the frequency of said uncompensated clock signal.

23. The real-time clock calibration method of claim 21 in which said slow clock signal is one-half the frequency of said uncompensated clock signal.

24. The real-time clock calibration method of claim 21 in which said calibration strobe is derived from said uncompensated clock signal divided by a first divisor.

25. The real-time clock calibration method of claim 24 in which said window trigger is derived from said calibration strobe divided by a second divisor.

26. The real-time clock calibration method of claim 25 in which said uncompensated clock signal is approximately 32,768 Hz.

27. The real-time clock calibration method of claim 26 in which said first divisor is 4032.

28. The real-time clock calibration method of claim 27 in which said second divisor is 248.

29. The real-time clock calibration method of claim 21 in which said uncompensated clock signal is replaced with a predetermined number of pulses per calibration strobe.

30. The real-time clock calibration method of claim 29 in which said predetermined number is one.

31. The real-time clock calibration method of claim 21 in which said calibration strobe enables one of said fast and second clock signals as needed in response to a calibration value.

32. The real-time clock calibration method of claim 21 in which said calibration strobe enables said fast and slow clock signals periodically in response to a calibration value.

33. The real-time clock calibration method of claim 21 in which said fast and slow clock signals are always enabled.

* * * * *